Dec. 30, 1947.    G. L. HOLLINGSWORTH    2,433,667
TIME MEASURING APPARATUS
Filed Dec. 29, 1943

Inventor:
Guilford L. Hollingsworth,
by Harry E. Dunham
His Attorney.

Patented Dec. 30, 1947

2,433,667

UNITED STATES PATENT OFFICE 2,433,667

TIME MEASURING APPARATUS

Guilford L. Hollingsworth, Schenectady, N. Y., assignor to General Electric Company, a corporation of New York Application December 29, 1943, Serial No. 516,083

7 Claims. (Cl. 177—352)

My invention relates to time measuring means and it has for one of its objects to provide an improved means of measuring time intervals of extremely short duration.

A further object of my invention is to provide an improved means for measuring the time interval between transmission of pulses into space and reception of an echo thereof from a remote object to determine the distance to such remote object. While in my present application I shall disclose my invention as employed in an echo system employing electromagnetic waves, it is, of course, equally useful in such systems employing waves of other types such as compressional waves.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention, and Fig. 2 represents certain characteristics pertaining to its operation.

Figure 1:
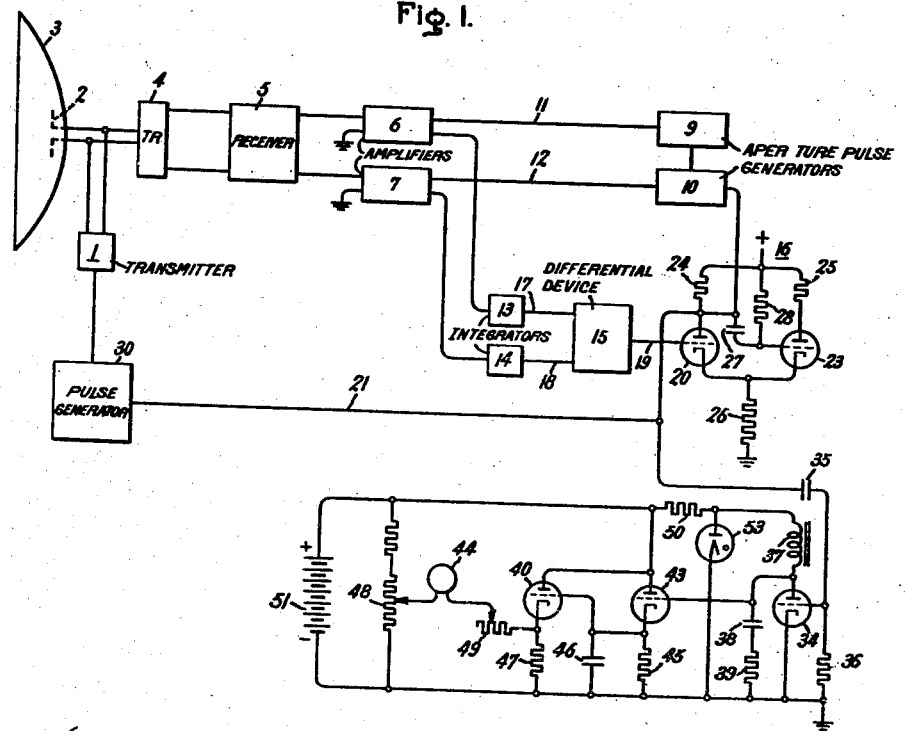
Figure 2:
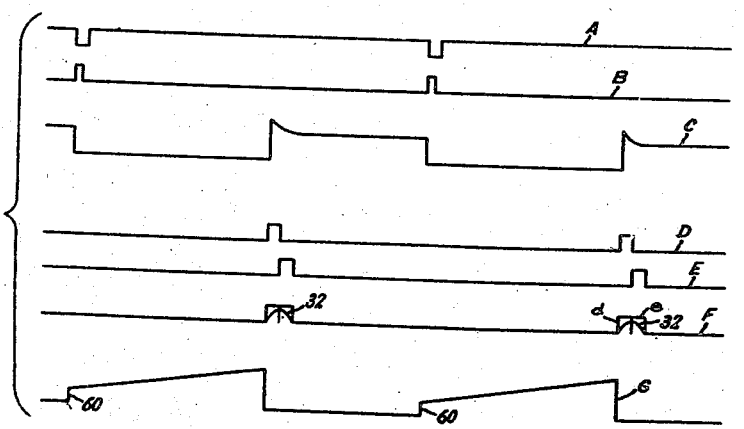

In Fig. 1, I have represented my invention as employed in a radio echo system of the type disclosed and claimed in application Serial No. 400,080, filed June 27, 1941, by William C. Hahn, and entitled Impulse systems, and which is assigned to the assignee of my present application.

It comprises means whereby the receiving system is maintained inoperative during the period after each radiated pulse except for two successive intervals when a desired echo is received during which it is rendered operative. The echo received during these two successive intervals is integrated over the respective intervals to produce a unidirectional voltage which controls the length of a square pulse which is initiated upon emission of the radiated pulse and terminated upon receipt of the echo.

In accord with my invention this square pulse is then utilized to produce a wave having a peak of intensity dependent upon the time elapsed between emission of the radiated pulse and receipt of the echo thereof, and hence the distance to the remote object producing said echo is determined from the intensity of this peak.

Referring now more particularly to Fig. 1, I have indicated a transmitter 1, which may be connected to supply pulses to the antenna 2 for radiation therefrom, this antenna ordinarily being arranged within a parabolic reflector 3. These pulses may have a duration of from one to ten microseconds and they may be radiated at a frequency of from 60 to 2,000 pulses per second. Echo pulses intercepted by the antenna 2 are supplied to receiving equipments 4 and 5. The equipment 4 may comprise the usual so-called TR device for protecting the receiver from the intense pulses produced by the transmitter 1, and the equipment 5 may comprise the usual radio pulse receiver which converts the wave of received frequency to a desired frequency for amplification and then translates the high frequency echo pulses to pulses of unidirectional current. These pulses of unidirectional current are amplified in two parallel connected electron discharge amplifiers 6 and 7. These amplifiers are normally maintained nonconducting and inoperative by equipments 9 and 10 except during two short aperture pulses, which occur in succession, and which are produced by the equipments 9 and 10 and supplied to the devices 6 and 7 over respective conductors 11 and 12 to render those devices conducting to an extent dependent upon the intensity of the echo received during the respective aperture pulses.

The time of occurrence of the pulses generated by the equipments 9 and 10 is determined by two integrators 13 and 14, a differential device 15 and a multivibrator 16. When the amplifiers 6 and 7 are operative they pass pulses of current having intensity dependent upon the intensity of the received echo. These current pulses are transmitted to integrators 13 and 14 respectively and integrated thereby to produce a unidirectional potential on the respective output conductors 17 and 18 of intensity dependent upon the intensity of the echo pulse received during the respective aperture pulse supplied over conductors 11 and 12. Differential device 15 produces a voltage on conductor 19 dependent upon the difference in these two voltages on conductors 17 and 18, this latter voltage on conductor 19 being supplied to the grid of an electron discharge device 20 in the delay multivibrator 16.

This delay multivibrator comprises two electron discharge devices 20 and 23 the anodes of which are connected to the positive terminal of a source of operating potential through resistances 24 and 25 and the cathodes of which are connected to ground through a common resistance 26. The anode of the discharge device 20 is connected to the control electrode of discharge device 23 through a condenser 27, and the control electrode of discharge device 23 is connected to the positive terminal of the source of operating potential through a resistance 28.

The operation of this delay multivibrator is controlled by a pulse generator 30, which operates to key the transmitter 1 to produce the radiated pulses, and which simultaneously supplies a pulse to multivibrator 16 over conductor 21. The pulses supplied to the multivibrator 16 may be represented by the wave A of Fig. 2 and the radiated pulses by the wave B of Fig. 2.

In the normal operation of the multivibrator the discharge device 23 is conducting by reason of the voltage supplied to its control electrode through resistance 26. Current in resistance 26 produces a voltage thereon sufficient to prevent the flow of current in device 20 and that device is nonconducting.

When the negative pulse of wave A is supplied from pulse generator 30 to the anode of device 20, it operates to drive the control electrode of device 23 negative with respect to the cathode with the result that this device becomes nonconducting and the potential on resistance 26 disappears. Device 20 then becomes conducting and its anode potential drops to a low value by reason of the drop in voltage in resistance 24. This condition is maintained by reason of the voltage on resistance 26 and the charge previously accumulated on condenser 27. During the time when this condition is maintained, the aperture pulse generators are quiescent and the amplifiers 6 and 7 are nonconducting and inoperative to pass current corresponding to the received echoes. After elapse of time sufficient to permit the discharge of condenser 27 through resistances 24 and 28 to reduce the negative voltage of control electrode of device 23 sufficiently to render that device conducting, current again flows therein through resistance 26. This renders the cathode of device 20 more positive with respect to its control electrode and reduces the current flowing therein. The action is cumulative, the increase in potential on the anode of device 20 causing control electrode of device 23 to become positive with the result that the multivibrator is restored to its initial condition immediately.

In this way a wave is generated on the anode of device 20 which is represented at C in Fig. 2. This wave is supplied to the aperture pulse generator 10 which generates the wave D of Fig. 2, this wave comprising short positive pulses occurring upon initiation of each positive pulse of the wave C. These positive pulses are supplied over conductor 12 to the device 7 to render that device operative. These positive pulses of wave D are also supplied to the pulse generator 9 which in turn generates the positive pulses of wave E. These pulses are supplied over conductor 11 to the amplifier 6 to render that amplifier conductive during the interval of the positive pulses of wave E.

The curve F of Fig. 2 shows the positive pulses of the waves D and E drawn on the same axis, the positive pulses of wave D being indicated by the rectangle d and the positive pulses of wave E being indicated by the rectangle e. The received echo is represented by the curved line 32 within the rectangles d and e, this curved line in the two rectangles d and e representing the portions of the received echo supplied to the respective devices 6 and 7 during the respective positive pulses of the waves D and E. The portion of the echo received during the positive pulse of the wave D is integrated by the equipment 14 to produce a voltage on conductor 18 of value dependent upon the integrated intensity of this portion of the echo. The portion of the echo received during the positive pulses of wave E is integrated by the integrator 13 to produce a voltage on conductor 17 dependent upon the integrated intensity of the echo received during the positive pulse of the wave E. If the received echo is received equally during the two positive pulses of waves D and E the two voltages on conductors 17 and 18 are of equal intensity and no change in voltage on conductor 19 occurs, whereas if the integrated intensity of the received pulse is greater during the positive pulse of wave D than during the positive pulse of wave E then a difference exists between the voltages on the conductors 17 and 18. These voltages are compared by a differential device 15 to produce a voltage on conductor 19, which varies in one direction or the other dependent upon the direction of the difference in voltage between the conductors 17 and 18, and by an amount dependent upon the magnitude of the difference.

This voltage on conductor 19 controls the length of the negative pulses of the wave C and hence the time of occurrence of the positive pulses of waves D and E thereby to maintain the devices 6 and 7 operative at the time when the echo is received. The manner in which the voltage on conductor 19, and hence that on the control electrode of device 20, controls the length of the negative pulse of wave C is apparent upon consideration of the fact that the length of this pulse is dependent upon the degree of discharge required of condenser 27 to render device 23 conducting. This in turn depends upon the extent to which device 20 is conducting during the interval of discharge of condenser 27. If device 20 be highly conducting, as by reason of a large positive voltage on its control electrode, so that a large current flows therein, then a large bias voltage is produced on resistance 26 and a greater discharge of condenser 27 is required before device 23 becomes conducting. This means that the negative pulse of wave C is long. If, on the other hand, device 20 is less conducting, as by reason of a less positive voltage on its control electrode, then the bias on resistance 26 is smaller and less time is required for discharge of condenser 27 sufficiently to render device 23 conducting.

Thus wave C is a substantially rectangular wave having negative pulses of duration dependent upon the time of receipt of the received echo. If the received echo be received from a remote airplane, for example, moving in the direction toward the equipment, then the echo represented by the curve 32 is received with greater amount during the aperture pulses of wave D than during the aperture pulses of wave E with the result that the lengths of the negative pulses of wave C are gradually reduced as the airplane approaches. Of course, the opposite is true as the airplane recedes from the equipment.

Thus the negative pulses of wave C are initiated upon emission of the radiated pulses and are terminated upon reception of the echo thereof during movement of the object from which the echo is received. This wave C is supplied through a condenser 35 to a resistance 36 connected between the control electrode and cathode of discharge device 34. This device is normally conducting passing current through inductance 37. Between its anode and cathode is connected a condenser 38 and a resistance 39. When the negative pulse of wave C appears on resistance 36 the device becomes nonconducting and condenser 38 begins to charge through inductance 37. Of course, upon receipt of the positive pulse of wave C device 34 again becomes conducting and condenser 38 discharges therethrough. The inductance 37, capacitance 38 and resistance 39 are so proportioned that the rate of charge of condenser 38 is constant with time. That is, the current through inductance 37, capacitor 38 and resistor 39 remains essentially constant for the duration of the negative portion of wave C. The result is that a voltage appears across condenser 38 and resistance 39 of the character indicated at G in Fig. 2.

This wave G has positive pulses of linearly increasing voltage corresponding in wave shape to the integral of the negative pulses of wave C, but having an intensity proportional only to the duration of wave C. The longer these negative pulses the more intense the peak of the positive pulses of the wave G becomes, and the shorter the negative pulses of wave C the less intense are the peaks of the positive pulses of wave G.

Discharge devices 40 and 43 and instrument 44 comprise a peak voltmeter measuring the peaks of the wave G to produce an indication on the meter 44 corresponding to the time interval between the radiated pulse and the received pulse. If desired, this instrument may be calibrated in terms of range to the remote object.

Discharge device 43 has its anode connected to the positive terminal of the source of potential 51 and its cathode connected to ground through a resistance 45 and a capacitance 46. The time constant of this resistance 45 and capacitance 46 is large relative to the intervals between the radiated pulses with the result that a substantially steady voltage appears across resistance 45 dependent in magnitude upon the intensity of the peaks of the wave G. This voltage is amplified by the device 40 and is reproduced on the resistance 47. The meter 44 is connected between the positive end of this resistance 47 and an intermediate point on a potentiometer 48 connected across the plate supply through a variable resistance 49. Resistance 49 and the connections to the potentiometer 48 may be so adjusted that the meter produces a desired reading corresponding to the range to the remote object. After such adjustment the index of the meter is automatically maintained in position corresponding to the time interval between the radiated pulse and the received echo and hence corresponding to the range to the remote object.

In the adjustment of potentiometer 48 and resistance 49 for operation, resistance 49 is first adjusted, preferably to a small value, and the apparatus is directed at a target of known nearby range. Of course, an artificial signal corresponding to such known range may be employed. The variable contact on resistance 48 is then adjusted until meter 44 reads the correct range. The equipment is then either directed at a target at long range, or an artificial signal corresponding to long range is supplied to it and resistance 49 is adjusted to a value such that meter 44 again reads the correct range. The contact on resistance 48 may now be readjusted if necessary for correct reading at short range, the process being repeated until the meter reads correctly throughout the range to be indicated.

In this way, the meter 44 is caused to indicate range in response to the linear variations in voltage of the wave G greater than the minimum value indicated at 60 thereon, this minimum value corresponding to zero range. This minimum value of voltage of wave G is the voltage on resistance 39 through which the constant charging current for condenser 38 flows. The devices 40 and 43 have linear response to voltages above this minimum value 60, whereas their response may be nonlinear to voltage variations below this value.

It will be observed that the range indication is dependent solely upon the magnitude of the peaks of wave G and that it is independent of the frequency at which these peaks occur. This is important because it frequently happens that the repetition rate of the radiated pulses varies either undesirably, as in the case where spark generators are employed in the generation of the pulses, or desirably where it is desired to avoid interference with similar equipment operating in the neighborhood at approximately the same frequency. Of course, source 51 should be of substantially constant voltage.

Preferably a current limiting resistance 50 is inserted in series with the anode circuit of discharge device 34 between the positive terminal of the source 51 and the inductance 37 and a two-element gaseous discharge device 53 is connected between the negative terminal of the source and the point between resistance 50 and the inductance 37. This discharge device is one of the type which inherently maintains a constant voltage between its anode and cathode notwithstanding the magnitude of the current flowing through it. In this way it maintains a substantial constant voltage across the series combination of inductance 37 and discharge device 34.

The resistance 50 is necessary to reduce the voltage applied from source 51 to device 34 to a value lower than that applied to device 43. Were no further means employed and the pulse rate varied the voltage applied to device 34 would vary due to this resistance. This undesired effect is avoided by use of the voltage regulator device 53.

While I have shown a particular embodiment of my invention, it will of course be understood that I do not wish to be limited thereto since various modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. In combination, means to radiate periodic pulses, means to receive echoes thereof, means to produce a square wave having square pulses of voltage of one polarity initiated upon emission of each radiated pulse and terminated upon reception of an echo from an object the range to which is to be determined, means to integrate said voltage pulses to produce a periodic voltage wave having second pulses whose polarity is continuously dependent upon the polarity of said square pulses and whose peak magnitude is a function of the length of said square pulses, whereby said peak magnitude corresponds to said range to said object, and means responsive to a plurality of said peaks to operate in accord with the range to said object.

2. The combination, in a pulse echo apparatus, of means to generate a substantially rectangular periodic voltage pulse wave having rectangular voltage pulses of one polarity of duration corresponding to the distance from which echoes are received in said apparatus, means controlled by said rectangular voltage pulses of one polarity to generate second periodic voltage pulses of the same duration having polarity continuously dependent upon the polarity of said rectangular pulses and having peak magnitudes variable with variations in said duration, and means controlled by a plurality of said peak magnitudes to indicate the range from which said echoes are received.

3. The combination, in a pulse echo system, of means to transmit periodic pulses and to receive echoes thereof from distant objects, an electron discharge device having an anode, a cathode, and a control electrode, means to supply between said control electrode and cathode a pulse wave having pulses of constant magnitude and duration dependent upon the distance from which said echoes are received poled to interrupt current in said device, a source of operating potential connected between said anode and cathode through an impedance, a condenser connected between said anode and cathode whereby said condenser charges to a value dependent upon the duration of said pulses and subsequently discharges through said discharge device, and range indicating means responsive to the peak voltage on said condenser.

4. The combination, in a pulse echo system, of means to transmit recurrent pulses and to receive an echo thereof from a remote object during the period between said pulses, an electron discharge device having an anode, a cathode, and a control electrode, a condenser and resistance connected in series between said cathode and anode, a source of operating potential connected through an impedance between said anode and cathode, means to supply between said control electrode and cathode recurrent pulses of constant intensity, each pulse being of duration corresponding to the distance to said object and poled to render said device nonconducting, whereby a voltage is produced between said anode and cathode rising abruptly on inception of each pulse and linearly throughout the duration of the pulse, said resistance, condenser, and impedance having values such that said condenser charges at a constant rate, said condenser discharging through said discharge device between said recurrent pulses, and a peak voltage responsive means connected to respond to said voltage, said voltage responsive means having linear response to said linear variations.

5. In a pulse echo system in which periodic square pulses are produced, each pulse having duration dependent upon the distance from which echoes are received, the combination comprising an electron discharge device having an anode, a control electrode, and a cathode, means to supply said pulses between said control electrode and cathode poled to render said device nonconducting, a source of operating potential connected between said anode and cathode, a resistance and a condenser connected between said anode and cathode, and a peak voltage responsive means connected to respond to the voltage across said resistance and condenser, said voltage responsive means having undesired nonlinear response to voltage variations in the low voltage part of its range and linear response in the higher voltage part of its range, and said resistance having value sufficient that the voltage produced thereon by the charging current of said condenser exceeds the range of non-linear response of said voltage responsive means.

6. Apparatus for measuring the average time interval between occurrence of two events periodically recurring at substantially the same frequency during a longer interval, comprising, in combination, means for generating a substantially rectangular pulse wave having first pulses of one polarity, each pulse having a length corresponding to the time between a pair of said events, means for deriving from each of said pulses a second voltage pulse having a polarity which is continuously dependent upon the polarity of said first pulse and a variable peak intensity which is a function of the length of said first pulse, and means for measuring the average intensity of a plurality of said peaks during said longer interval, thereby to measure said average time interval.

7. Apparatus for measuring the time interval between occurrence of two events, comprising, in combination, means for generating a first voltage pulse of one polarity during said interval, said pulse being initiated abruptly upon occurrence of the first event and terminated abruptly upon occurrence of the second event, means for deriving from said first pulse a second voltage pulse having a polarity continuously dependent upon the polarity of said first pulse and a variable peak intensity dependent upon the length of said first pulse, and means for measuring the peak intensity of said second pulse, thereby to measure said interval.

GUILFORD L. HOLLINGSWORTH.

REFERENCES CITED

The following references are of record in the file of this patent:

UNITED STATES PATENTS

| Number | Name | Date |
| --- | --- | --- |
| 2,301,195 | Bradford | Nov. 10, 1942 |
| 2,012,837 | Tear | Aug. 27, 1935 |
| 2,284,699 | Turner | June 2, 1942 |
| 2,363,810 | Schrader | Nov. 28, 1944 |

FOREIGN PATENTS

| Number | Country | Date |
| --- | --- | --- |
| 469,417 | Great Britain | July 26, 1937 |
| 573,465 | France | June 25, 1924 |